Feb. 26, 1963 J. VOGT ET AL 3,079,138
SUSPENSION MEANS FOR THE WHEELS OF POWER VEHICLES
Filed Oct. 29, 1959 2 Sheets-Sheet 1

Inventors
Jakob Vogt and
Joan van der Brugghen,
Diggins v LeBlanc
Attorneys

Inventors
Jakob Vogt and
Joan van der Brugghen,

Attorneys

United States Patent Office 3,079,138
Patented Feb. 26, 1963

3,079,138
SUSPENSION MEANS FOR THE WHEELS OF POWER VEHICLES
Jakob Vogt, Dusseldorf-Oberkassel, Germany, and Joan van der Brugghen, Eindhoven, Netherlands, assignors to Viktor Langen, Dusseldorf-Oberkassel, Germany, and van Doorne's Automobielfabriek N.V., Eindhoven, Netherlands, a body corporate of the Netherlands
Filed Oct. 29, 1959, Ser. No. 849,667
Claims priority, application Germany Oct. 31, 1958
7 Claims. (Cl. 267—47)

The individual suspension of the front wheels of a power vehicle is usually effected with the use of triangulated transverse or longitudinal arms. The connection between the arm and the axle carrier which serves as the bearing for the hub of the wheel is customarily effected by ball and socket joints. With such a connection difficulties hardy arise because the shape of the arms can be adapted to conform to the outer shape of the ball and socket joint in order that they may be fixed securely to it.

The position is different, however, when, instead of the arms, bundles of leaf-springs arranged transversely of the vehicle are used. Then, on the one hand, the ball and socket joint must be fixed at the end of the bundle of leaf-springs. Also, it must not lose its hold even if one of the springs should happen to break. On the other hand, the leaf-springs, when they bend, must be able to move relative to one another in the longitudinal direction. This movement of the springs relative to one another must not be impaired by the fastening of the ball joint at the end. Further, the leaf-springs should project as far as possible beyond the middle plane of the ball and socket joint in order to avoid additional bending moments on the springs. A fixing flange arranged laterally on the ball and socket joint is, therefore, not to be recommended.

According to the present invention, all the difficulties above-mentioned are obviated by connecting the master leaf-spring rigidly to the ball and socket joint and allowing the adjacent spring to make a limited movement in the longitudinal direction of the springs. Thus, for example, both leaf-springs can be engaged by a clamp which is disposed in the central plane of the ball and socket joint and is rigidly fixed to the master leaf-spring and acts as a stop for the adjacent leaf-spring which is movable to a limited extent in the longitudinal direction. In some cases the clamp may be made in two parts.

Various constructional embodiments of the invention are illustrated, by way of example, in the accompanying drawings, in which.

Figure 1:
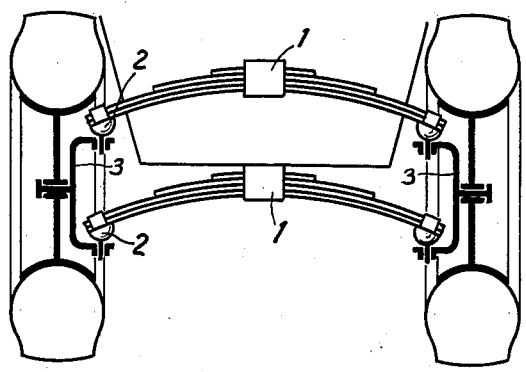
FIGURE 1 illustrates diagrammatically the front axle of a power vehicle in which the wheels are connected through ball and socket joints to bundles of transversely disposed leaf-springs.
Figure 2:
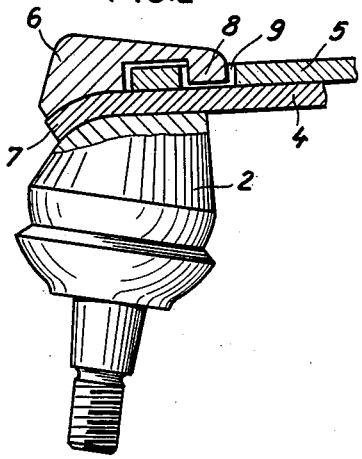
FIGURE 2 is a part sectional view on a larger scale showing the clamp connecting the ball and socket joint to the leaf-springs.
Figure 3:
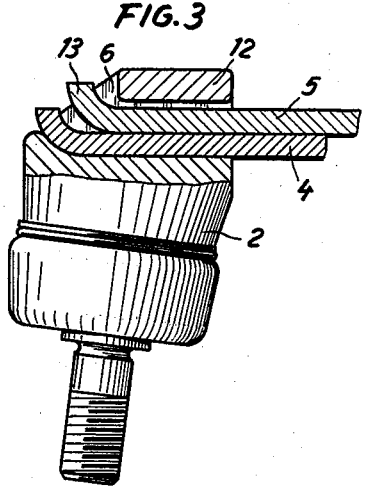
FIGURE 3 is a similar view of another form of clamp.
Figure 4:
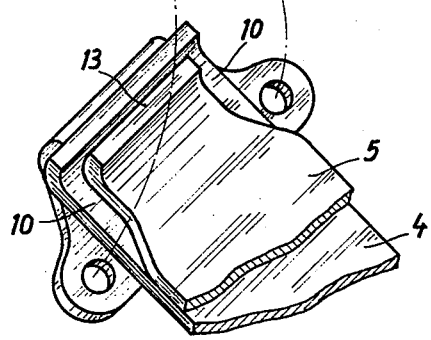
FIGURE 4 is a perspective view of the clamp shown in FIGURE 3, with the leaf-springs.

Referring to the drawings, ball and socket joints 2 connected to the axle carrier 3 are arranged at the outer ends of a bundle of leaf-springs 1 which are arranged transversely of the vehicle. A master spring 4 of the bundle of leaf-springs 1 is rigidly connected to the ball and socket joints 2, whereas the adjacent leaf 5 is movable to a limited extent relative to the ball and socket joint 2 in the longitudinal direction of the springs. As shown in FIGURES 2 to 4, the two leaf-springs 4 and 5 are held by a clamp 6 which is disposed in the central plane of the ball and socket joint. The clamp 6 clamps the master spring rigidly and also acts as a stop for the adjacent leaf 5 which is movable by a small amount in the longitudinal direction of the spring.

The action of the clamp 6 shown in FIGURE 2, is as follows.

The master leaf-spring 4 is rigidly clamped by the clamp 6 and thereby rigidly connected to the ball and socket joint 2 only at its end 7. For holding the second spring 5 the clamp 6 has a collar 8 which projects in a recess 9 in the leaf-spring 5. Since the length of the recess 9 is greater than that of the collar 8 the leaf-spring 5 is able to move relative to the clamp 6 and ball and socket joint 2. If the master leaf-spring should happen to break, the ball and socket joint 2 is still held to the spring 5 by means of the collar 8 of clamp 6.

In the construction shown in FIGURES 3 and 4 the master leaf-spring 4 is of greater width than the adjacent spring 5. In this case only the projecting edge 10 of the master spring 4 is clamped by the steps 11 of the clamp 6, whereas the second spring 5 can slide under the bridge 12 of the clamp 6. The spring 5 is prevented from sliding out of the clamp 6 only by its turned-up end 13.

Figure 5:
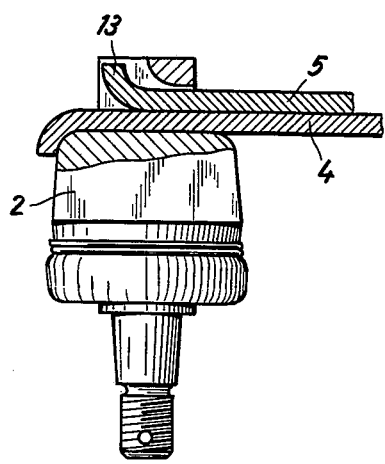
FIGURES 5 and 6 are a part sectional side view and end elevation respectively showing another form of clamp.
Figure 6:
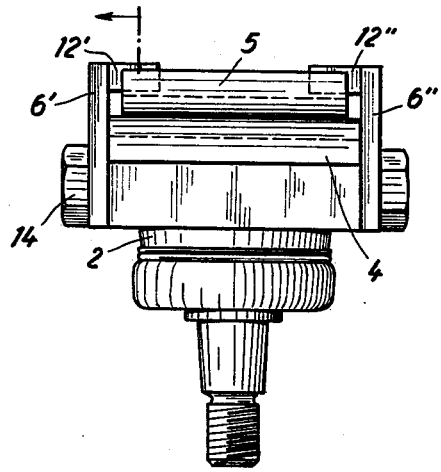

The clamp shown in FIGURES 5 and 6 is divided transversely into two halves 6' and 6" which are mirror images of one another. These halves are clamped together by means of a bolt 14 and thereby clamp the master leaf-spring 4 firmly between them. The adjacent spring 5 can slide in its longitudinal direction in the two halves 12', 12" of the bridge of the clamp until the turned-up end 13 of the spring meets the bridge.

Figure 7:
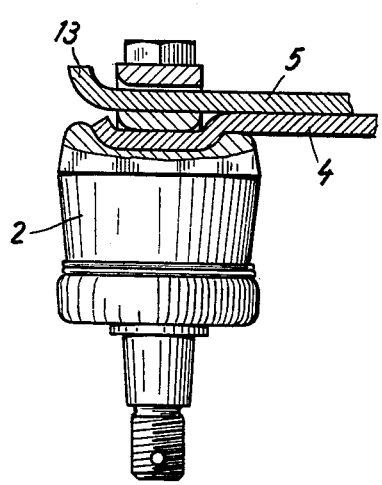
FIGURES 7 and 8 are part sectional side and end views respectively showing a further form of clamp.
Figure 8:
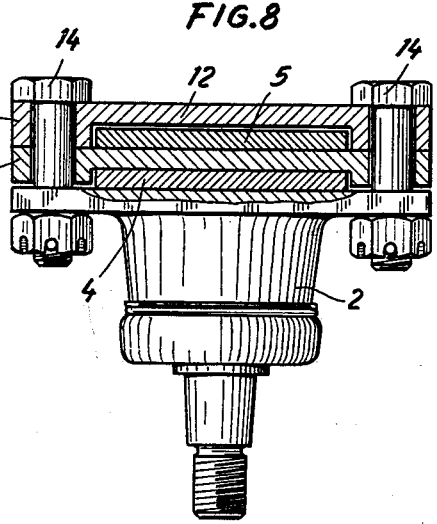

The clamp illustrated in FIGURES 7 and 8 consists of two parts which are disposed one above the other, namely a clamping part 6''' and a stop part 6''''. The clamping part holds the master leaf-spring 4 firmly and the bridge 12 of the stop part limits the longitudinal movement of the leaf-spring 5. Both parts 6''' and 6'''' are fixed to the ball and socket joint by bolts 14.

We claim:

1. Leaf spring suspension means for the front wheels of a power vehicle, comprising: a bundle of spring leaves disposed transversely of the vehicle; a ball and socket joint; a clamp rigidly securing said ball and socket joint to one end of the master leaf of said bundle of spring leaves; said clamp adapted to engage at least one adjacent leaf of said bundle of spring leaves; said adjacent leaf being movable to only a limited extent in a longitudinal direction away from said one end of said master leaf; said clamp including stop means for limiting the longitudinal movement of said adjacent leaf; said master leaf having a width greater than that of said adjacent leaf and only the projecting edge of said master leaf is clamped by said clamp; and said adjacent leaf being slidable under said clamp and prevented from sliding out of said clamp only by a turned-up edge at the end of said adjacent leaf.

2. Leaf spring suspension means for the front wheels of a power vehicle, comprising: a bundle of spring leaves disposed transversely of the vehicle; a ball and socket joint having a casing; a clamp rigidly securing said casing to one end of the master leaf of said bundle of spring leaves; said clamp adapted to engage at least one adjacent leaf of said bundle of spring leaves; said adjacent leaf being movable relative to said casing in a direction parallel to said master leaf; and said clamp including stop means for limiting said relative movement of said adjacent leaf.

3. Leaf spring suspension means in accordance with claim 2 wherein said adjacent leaf includes a stop member formed at the end of said adjacent leaf which engages said stop means of said clamp for limiting said relative movement of said adjacent leaf.

4. Leaf spring suspension means for the front wheels of a power vehicle, comprising: a bundle of spring leaves disposed transversely of the vehicle; a ball and socket joint; a clamp rigidly securing said joint to one end of the master leaf of said bundle of spring leaves; said clamp adapted to engage at least one adjacent leaf of said bundle of spring leaves; said adjacent leaf being movable relative to said clamp and joint in a direction parallel to said master leaf; said clamp including first stop means for limiting said relative movement of said adjacent leaf; and said adjacent leaf being slidable under said clamp and prevented from sliding out of said clamp only by second stop means which are formed at the end of said adjacent leaf and which engage said first stop means of said clamp.

5. Leaf spring suspension means in accordance with claim 4 wherein: said clamp has one end engaging only said master leaf so as to rigidly secure said master leaf to said joint; said second stop means includes a recess; said first stop means includes a collar; said collar being formed on the other end of said clamp and projecting into said recess; and said recess being longer than said collar so that said adjacent leaf may move relative to said clamp and joint.

6. Leaf spring suspension means in accordance with claim 4 wherein: said second stop means is a turned-up edge; said clamp comprises two transverse side portions which are mirror images of one another; said portions being clamped together so as to rigidly secure said master leaf to said joint in a transverse direction; and said first stop means includes transverse members projecting from each of said portions and extending loosely over said adjacent leaf so that said adjacent leaf may move relative to said clamp and joint.

7. Leaf spring suspension means in accordance with claim 4 wherein: said second stop means is a turned-up edge; said clamp comprises an upper and lower portion; said lower portion rigidly secures said joint to said master leaf; and said upper portion loosely fits over said adjacent leaf so as to constitute said first stop means so that said adjacent leaf may move relative to said clamp and joint.

References Cited in the file of this patent

UNITED STATES PATENTS

| 1,480,624 | Lovejoy | Jan. 15, 1924 |
| 1,598,679 | Fletcher et al. | Sept. 7, 1926 |
| 1,706,556 | Wright | Mar. 26, 1929 |

FOREIGN PATENTS

| 608,937 | Great Britain | Sept. 23, 1948 |